(12) United States Patent
Reddington

(10) Patent No.: US 9,596,250 B2
(45) Date of Patent: Mar. 14, 2017

(54) SYSTEM AND METHOD FOR PROTECTING AGAINST POINT OF SALE MALWARE USING MEMORY SCRAPING

(71) Applicant: Trusted Knight Corporation, Annapolis, MD (US)

(72) Inventor: Raymond Lloyd Reddington, Courtenay (CA)

(73) Assignee: Trusted Knight Corporation, Annapolis, MD (US)

(*) Notice: Subject to any disclaimer, the term of this patent is extended or adjusted under 35 U.S.C. 154(b) by 0 days.

(21) Appl. No.: 14/709,224

(22) Filed: May 11, 2015

(65) Prior Publication Data

US 2015/0319183 A1 Nov. 5, 2015

Related U.S. Application Data

(63) Continuation-in-part of application No. 13/667,256, filed on Nov. 2, 2012, now abandoned, which is a
(Continued)

(51) Int. Cl.
*H04L 29/06* (2006.01)
*G06F 21/53* (2013.01)
*G06F 21/52* (2013.01)

(52) U.S. Cl.
CPC .......... *H04L 63/1416* (2013.01); *G06F 21/52* (2013.01); *G06F 21/53* (2013.01);
(Continued)

(58) Field of Classification Search
CPC .. G06F 21/554; G06F 21/577; G06F 21/6245; G06F 21/78; G06F 21/86;
(Continued)

(56) References Cited

U.S. PATENT DOCUMENTS 4,177,510 A 12/1979 Appell et al.
7,774,595 B2 8/2010 Geon et al.
(Continued)

FOREIGN PATENT DOCUMENTS

JP 2007-116641 5/2007
WO WO 2008/127668 10/2008

OTHER PUBLICATIONS

Bassoc—2005 NPL obtained:Jun. 22, 2016 from: www.codeproject.com/Articles/11363/Entering-the-kernel-without-a-driver-and-getting-i.*
(Continued)

*Primary Examiner* — Jung Kim
*Assistant Examiner* — Tri Tran
(74) *Attorney, Agent, or Firm* — Beyer Law Group

(57) ABSTRACT

A software, system and methodology for protecting against malware Point-of-Sale attacks that utilize, for example, memory scraping techniques. The application protects Point-of-sale hardware and its software against memory scraping malware attacks, and the loss of critical user credit card and confidential information often swiped at a terminal or stored in point of sale application databases. An embodiment of a method for blocking memory scraping attacks includes the following steps. Upon detecting a credit card swipe submission event from local hardware or comport event specific memory table events are flagged as unreadable, and immediately after allowing the data to be properly submitted, the system memory tables are cleared of data and specific memory processes are flagged as readable again. The method prevents memory scraping or point of sale malware from capturing swiped credit card data or input data, thereby protecting the user from theft of credit card data or other credentials.

16 Claims, 19 Drawing Sheets

Related U.S. Application Data continuation of application No. 12/427,833, filed on Apr. 22, 2009, now Pat. No. 8,316,445.

(52) U.S. Cl.
CPC .... *H04L 63/1441* (2013.01); *G06F 2221/031* (2013.01); *G06F 2221/2143* (2013.01)

(58) Field of Classification Search
CPC ............... G06F 21/53; G06F 2221/031; H04L 63/1416; H04L 63/1441
See application file for complete search history.

(56) References Cited

U.S. PATENT DOCUMENTS

| | | | |
|---|---|---|---|
| 7,779,062 | B2 | 8/2010 | Waterson |
| 7,975,308 | B1 | 7/2011 | Satish et al. |
| 8,020,215 | B2 | 9/2011 | Nam |
| 8,316,445 | B2 | 11/2012 | Liske |
| 2004/0215971 | A1 | 10/2004 | Nam |
| 2006/0036731 | A1 | 2/2006 | Mossman et al. |
| 2006/0070126 | A1 | 3/2006 | Grynberg |
| 2006/0206943 | A1 | 9/2006 | Ellison et al. |
| 2006/0253582 | A1 | 11/2006 | Dixon et al. |
| 2007/0182714 | A1 | 8/2007 | Pemmaraju |
| 2007/0240212 | A1* | 10/2007 | Matalytski .............. G06F 21/83 726/22 |
| 2007/0245343 | A1 | 10/2007 | Shannon et al. |
| 2007/0250927 | A1 | 10/2007 | Naik et al. |
| 2008/0016339 | A1 | 1/2008 | Shukla |
| 2008/0189790 | A1 | 8/2008 | Park |
| 2008/0263672 | A1 | 10/2008 | Chen et al. |
| 2008/0274716 | A1 | 11/2008 | Fok et al. |
| 2009/0007243 | A1 | 1/2009 | Boodaei et al. |
| 2009/0077383 | A1 | 3/2009 | de Monseignat et al. |
| 2009/0217377 | A1 | 8/2009 | Arbaugh et al. |
| 2013/0061323 | A1 | 3/2013 | Liske |

OTHER PUBLICATIONS

Keong—2004 NPL obtained: Jun. 22, 2016 from: http://www.security.org.sg/code/SIG2_DefeatingNativeAPIHo.*
International Search Report for PCT/US10/01199 mailed Jun. 17, 2010.
Who invented the USB flash drive—Jill Beissel Aug. 12, 2011.
The difference between ActiveX and Plug-In, Sep. 29, 2010.
NPL-2012-IOActive ZeusSpyEyeBankingTrojanAnalysis.
Wikipedia NPL—Protection Ring URL: http://en.wikipedia.org/wiki/Protection_ring, date; Jun. 24, 2014.
Brian Krebs, "ING Introduces Tool for Safe E-Banking on Infected PCs", http://voices.washingtonpost.com/securityfix/2008/05/ing_tool_provides_safe_ebankin_1.html, May 23, 2008.
Matsumoto et al., "A Keylogger Detection Using Dynamic API Inspection", Intrusion Detection, Special Issue, Reconsidering Computer Security Technology for Information Systems, vol. 48, No. 9, Sep. 2007.
Salam et al., "Anti-Hook Shield Against the Software Key Loggers", Al-Khawarizmi Institute of Computer Science, University of Engineering and Technology, National Conference on Emerging Technologies, 2004.
Lynn Erla Beegle, "Rootkits and Their Effects on Information Security", Information Systems Security, May/Jun. 2007, pp. 164-176.
Li et al., "SpyShield: Preserving Privacy from Spy Add-ons", School of Informatics, Indiana University at Bloomington, Sep. 5, 2007.
Ross et al., "Stronger Password Authentication Using Browser Extensions", Security '05 Technical Program, Jul. 31, 2005.
Idika et al., "A Survey of Malware Detection Techniques", Department of Computer Science, Purdue University, Feb. 2, 2007.
Florencio et al, "Stopping a Phishing Attack, Even When the Victims Ignore Warnings", Microsoft Research, CiteSeer, 2005.
Invalidity Contentions including Exhibits 1-7, May 13, 2015.
Plaintiff Trusted Knight's Opening Claim Construction Brief, Jul. 31, 2015.
Defendant's Opening Claim Construction Brief, Jul. 31, 2015.
Declaration of Dr. Seth Nielson including Exhibit A, Jul. 31, 2015.
Defendant's Responsive Claim Construction Brief, Aug. 28, 2015.
Plaintiff Trusted Knight's Answering Claim Construction Brief, Aug. 28, 2015.
Declaration of Scott M. Nettles Ph.D. in Support of Plaintiff Trusted Knight's Answering Claim Construction Brief, Aug. 28, 2015.
Defendant's First Amended Initial Invalidity Contentions, Nov. 6, 2015.
Claim Construction Opinion, Nov. 19, 2015.
Order on Claim Construction, Nov. 19, 2015.
Opening Brief of Plaintiff-Applicant, Apr. 4, 2016.

* cited by examiner

TRACK 1 STANDARD

%B4510123456789124^FRIST/LAST^10162000000000011000000000000000%

| SS | FC | PAN | FS | CN | FS | ED | SC | DD | ES | LRC |

SS: START SENTINEL (%)
FC: FORMAT CODE (B OR b)
PAN: PRIMARY ACCOUNT NUMBER (UP TO 19 DIGITS LONG)
FS: FIELD SEPARATOR (^)
CN: CARDHOLDER'S NAME (UP TO 26 CHARACTERS LONG)
ED: EXPIRY DATE (IN THE FORM, "YYMM")
SC: SERVICE CODE
DD: DISCRETIONARY DATE (MAY INCLUDE THE CARD VERIFICATION VALUE [CVV/CODE, THE PIN VERIFICATION VALUE, AND THE PIN VERIFICATION KEY INDICATOR)
ES: END SENTINEL (?)
LRC: LONGITUDINAL REDUNDANCY CHECK

TRACK 2 STANDARD

;4510123456789124=10162011000000000?%

| SS | PAN | FS | ED | SC | DD | ES | LRC |

SS: START SENTINEL (;)
PAN: PRIMARY ACCOUNT NUMBER (UP TO 19 DIGITS LONG)
FS: FIELD SEPARATOR (=)
ED: EXPIRY DATE (IN THE FORM, "YYMM")
SC: SERVICE CODE
DD: DISCRETIONARY DATE (SIMILAR TO THAT IN TRACK 1)
ES: END SENTINEL (?)
LRC: LONGITUDINAL REDUNDANCY CHECK

*FIG. 6*

SYSTEM AND METHOD FOR PROTECTING AGAINST POINT OF SALE MALWARE USING MEMORY SCRAPING

This is a Continuation-in-Part of U.S. application Ser. No. 13/667,256 filed on Nov. 2, 2012, which is a Continuation of U.S. application Ser. No. 12/427,833 filed Jul. 13, 2010, which claims the benefit of U.S. Provisional Patent Application Ser. No. 61/125,178 filed on Apr. 23, 2008. Priority is claimed based on U.S. application Ser. No. 13/667,256 filed on Nov. 2, 2012, which claims the priority of U.S. application Ser. No. 12/427,833 filed Jul. 13, 2010, and which claims the priority of U.S. Provisional Patent Application Ser. No. 61/125,178 filed on Apr. 23, 2008, the entire contents of which are hereby incorporated by reference.

BACKGROUND OF THE INVENTION

Field of the Invention

The present invention relates generally to defending Point of Sale computer systems against security breaches and, more particularly, to defending such systems against memory scraping spyware and other malware attacks.

Description of the Background Art

Point-of-sale (POS) systems are extremely critical components in any retail environment. These systems have evolved beyond simple cash registers into modern POS systems and they tend to be tied to a business's payment processing through networked PC based platforms which include Windows XP, Windows 7, Windows Embedded POS and Windows CE.

This poses a significant risk as these operating systems are already vulnerable to various exploits and malware online. Credit and debit card data theft is one of the most common forms of Cybercrime today.

Cybercrime gangs organize sophisticated operations to steal vast amounts of credit card track data before selling it in underground marketplaces. Criminals can use the data stolen track from a card's magnetic strip to create clone cards. It's a potentially lucrative business with individual cards selling for as little as five dollars.

There are several methods that attackers can deploy to steal this data. One option is to gain access to a database where card data is stored. Due to PCI standards over the past several years, this has forced hackers into other methods of card theft. Another option is to target the point at which a retailer first acquires that card data—the Windows Point of Sale (POS) system.

Modern POS systems are pre-configured Windows computers with sales software installed and are equipped with a card reader. Card data can be stolen by installing a device onto the card reader and personal identification number (PIN) pad which can read the data off the card's magnetic strip and possibly compromise the card holder PIN. This is a process commonly known as "skimming". This form of crime is difficult as it requires additional hardware and physical access to the card reader and it is difficult to carry out this type of theft on a large scale.

Point-of-sale (PUS) malware is specially crafted malicious software written to search for, collect and export credit card cardholder data.

Random-access memory (RAM) is a form of computer data storage. A random-access memory device allows binary data to be read and written in computers in a data processing capacity. This malware targets this Random-access memory (RAM) by recognizing Card holder data (CHD) in memory and scraping the contents of credit card data as it passes through memory buffers on an infected machine.

Once a Point-of-sale computer is compromised the malware is installed remotely. Point-of-sale memory RAM scrapers steal credit card payment data or more specifically credit card track one and track two data—from the Random-access memory (RAM) of Point-of Sale (POS) systems.

This is generally accomplished, wherein the attackers must first identify points in the Random-access memory (RAM) on a compromised computer where the Card Holder data (CHD) is unencrypted or passing in memory in plain readable text.

Once this area of Random-access memory (RAM) has been pinpointed, the attackers will typically deploy one of three types of crimeware malware. These types of crimeware malware typically are key stroke loggers, memory dumpers and network sniffers.

Point of sale malware performs two specific functions when installed as a driver or as a system process and can operate at the kernel level scraping every memory page available, specifically process enumeration and memory dumping—enumerating all processes of interest and writing memory into a buffer or dumping into a file for later theft.

The malware further reads memory and performs a track data search—sorting through the buffered/dumped memory for card information which contains a specific format (card track data delimiters and separators as well as a track Luhn algorithm search.

Memory scraping can be done in Windows using EnumProcesses (which retrieves the process identifier for each process object in the system) to enumerate processes on the system looking for specific processes of interest by name (such as pos.exe, micros.exe, etc.) and using the associated process ID (PID) with the OpenProcess (which opens an existing local process object) name to obtain a handle.

The process can be opened with PROCESS_QUERY_INFORMATION and PROCESS_VM_READ in order to access the target process resources.

VirtualQueryEx retrieves information about a range of pages within the virtual address space of a specified process on the handle can obtain all memory regions and the contents can be copied and scanned from all non-image regions with ReadProcessMemory reads data from an area of memory in a specified process. The entire area to be read must be accessible or the operation fails. This unique combination of functions is found in the import tables of these classes of memory scraping point of sale malware.

Protected processes as introduced in the Windows operating system control the rights at the kernel level that can be granted to thread and process objects when opened or duplicated by user-mode processes. Unfortunately, this is an all-or-nothing deal that restricts all but a set of limited query accesses.

Memory scraping locates sensitive data in an application by scanning for signs of the intended data and copying it. This works because decrypted or raw data exists temporarily in memory even when it might be stored or transmitted securely.

SUMMARY OF THE INVENTION

A system and methodology protecting against Point-of-Sale malware using memory scraping is described. The system and method of the invention may be implemented in the processor memory of a Point-of-Sale terminal, or in the system memory of a network or server that controls, centralizes or otherwise communicates with one or more Pointof-Sale terminals. The invention may also be implemented on a tangible storage medium that is then accessed, installed or otherwise loaded onto a Point-of-Sale terminal, or in the system memory of a network or server that controls, centralizes or otherwise communicates with one or more Point-of-Sale terminals.

In one embodiment, for example, a method of the present invention is described for protecting a computer system from Card Holder Data (CHD) theft that include memory scraping malware or logging of user inputted data, the method comprises steps of: specifying a particular application to be protected from unauthorized memory scraping of user input; identifying additional system processes that may serve as a source of unauthorized memory scraping of user input; installing a kernel level driver and system service which enumerates and identifies all running processes on the active machine; identifying all process identification (PID) of running applications and (RAM) Random-access memory flags; identifying and attaching to vulnerable system processes and removing PROCESS_VM_READ flags from dwDesiredAccess; and adding PAGE_NOACCESS or PAGE_GUARD flags when appropriate.

In another embodiment, for example, a module for inserting and executing predetermined software processes at a zero-ring level protecting kernel memory from manipulation of our protection processes, said software processes including: a process of monitoring all application processes which monitor system memory for suspicious PROCESS_VM_WRITE processes; and a module which block any attempts of memory scraping using PROCESS_QUERY_INFORMATION or queries using the flag PROCESS_ALL_ACCESS;

In another embodiment, for example, a system and method for protecting against Point of Sale malware using memory scraping is described that comprises: a process of intercepting data inputs or swiped Card Holder Data (CHD) at the hardware Interrupt level or zero-ring level; a process of (1) establishing a connection with COM port data, (2) encrypting all data passed from the COM or USB ports, (3) passing this data to the intended software application, and (4) decrypting the data with a software module and encryption key while adding PAGE_NOACCESS or PAGE_GUARD flags in memory.

In another embodiment, for example, System and Method for Protecting Against Point Of Sale Malware Using Memory Scraping is described that comprises: application software that is desired to be protected from unauthorized tampering of protection; a first module for protecting the application software from unauthorized tampering or disabling, wherein the first module blocks attempts at unauthorized logging from processes that run on the computer system in user mode; and a second module for blocking attempts at unauthorized logging from processes running in kernel mode. Both modules also block unauthorized disabling of the application or driver uninstallation.

BRIEF DESCRIPTION OF THE DRAWINGS

Hereinbelow is a brief description of each of the drawings illustrating the various aspects and embodiments of the present invention, wherein:

FIG. 6 is a diagram that illustrates the current credit card magnetic stripe data standard;

DETAILED DESCRIPTION OF THE PREFERRED EMBODIMENTS

Definition of Terms

Figure 1:
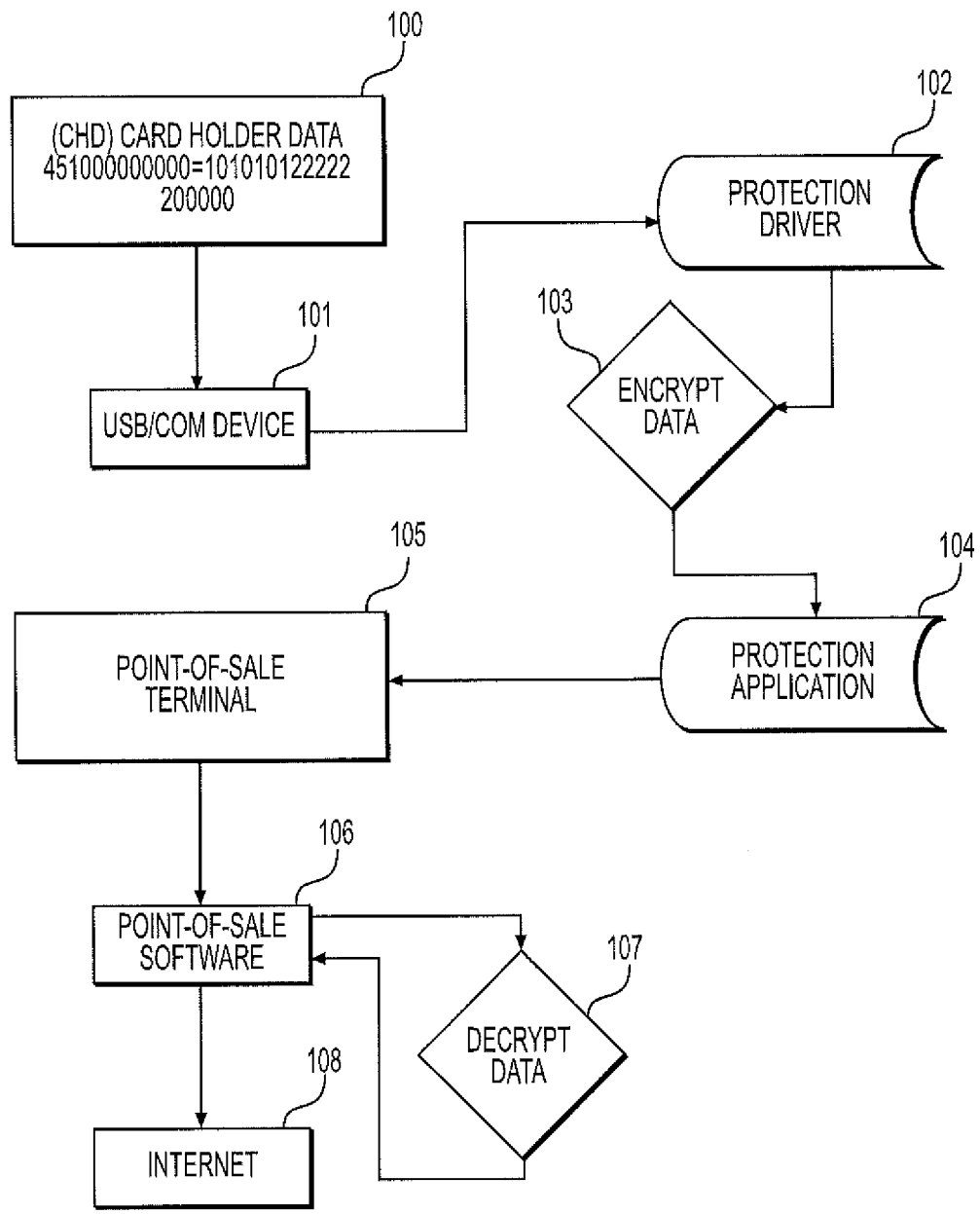
FIG. 1 is a very general block diagram of a Point-of-sale system (e.g., a Windows based-compatible Point-of-sale system) in which software-implemented processes of the present invention may be embodied.

| | |
|---|---|
| AKL | Anti-key logger |
| API Stack | Application Program Interface Stack |
| PCI DSS | PCI Data Security Standard (PCI DSS) refers to a set of requirements designed to ensure that all companies that process, store, or transmit credit card information maintain a secure environment. |
| DLL | Dynamic Link Library |
| DDE | Dynamic Data Exchange |
| Credit Card Data | The magnetic stripe of payment cards has three writable data tracks 1, 2, and 3. Payment cards only use Tracks 1 and 2, which have been defined the in International Organization for Standardization (ISO)/International Electrotechnical Commission |
| Hook | An application connecting to an API |
| IRQ | Interrupt Request |
| Point Of Sale | Also called POS or checkout, during computerization later becoming electronic point of sale or EPOS, is the place where a retail transaction is completed. It is the point at which a customer makes a payment to the merchant in exchange for goods or services |

Exemplary embodiments of the present invention that are shown in the drawings are summarized below. It is to be understood, however, that there is no intention to limit the invention to the specific forms described herein. One skilled in the art can recognize that there are numerous modifications, equivalents and alternative constructions that fall within the spirit and scope of the invention as expressed in the embodiments.

In the following description, for purposes of explanation, numerous specific details are set forth in order to provide a thorough understanding of the invention and embodiments thereof. It will be apparent, however, to one skilled in the art that the invention can be practiced without these specific details. In other instances, structures and devices are shown in block diagram form in order to aid in understanding the embodiments of the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The present invention provides a system and method for managing malware. In general, a memory scraping credit card Trojan process starts creating a new mutex; the Trojan process may optionally remove itself after execution. The mutex installs malware processes onto the point of sale machine, spawns new processes and injects itself into explorer.exe or other windows processes. The malicious process then performs memory scraping functions, thus stealing credit card data from the vulnerable machine, whereby exfiltration and optional keylogging can be performed. In at least one embodiment, the present protection method provides protection against this type of threat by establishing a Ring 0 hook, installing a system encryption driver and system processes which perform the monitoring and protection mechanisms described herein.

FIG. 1 is a general block diagram of a Point-of-sale system (e.g., a Windows based-compatible Point-of-sale system) in which software-implemented processes of the present invention may be embodied. In the general operation of the invention, a particular application is specified to be protected from unauthorized memory scraping of user input. Additional system processes that may serve as a source of unauthorized memory scraping of user input are identified; and a kernel level driver and system service which enumerates and identifies all running processes on the active machine are applied. The software identifies all process identification (PID) of running applications and Random-access memory (RAM) flags, identifying and attaching to vulnerable system processes. With processes that are determined to be anomalous or out of place, PROCESS_VM_READ flags from dwDesiredAccess are removed; and PAGE_NOACCESS or PAGE_GUARD flags are added when appropriate, thereby cutting of the anomalous processes. In a typical transaction, Card Holder Data (CHD) 100 from a credit card is inputted into a conventional card reader or USB/COM device 101. The CHD 100 is then processed by a protection driver 102, wherein the software of the invention scans for and identifies anomalous processes and actions indicative of the presence and operation of memory scraping malware, as described above. In addition, the protection driver 102 encrypts the CHD 103. The protection application 104 then transfers the encrypted CHD to the Point-of-Sale terminal 105. In addition, the protection application 104 performs processes for removing the malware or mutex. Finally, the protection application 104 decrypts the CHD 107 which is then transferred to the Point-of-Sale terminal 105.

The Point-of-Sale terminal 105 uses conventional Point-of-Sale software 106, wherein the Point-of-Sale software 106 transmits data to the Internet 108 to complete the transaction.

Figure 2:
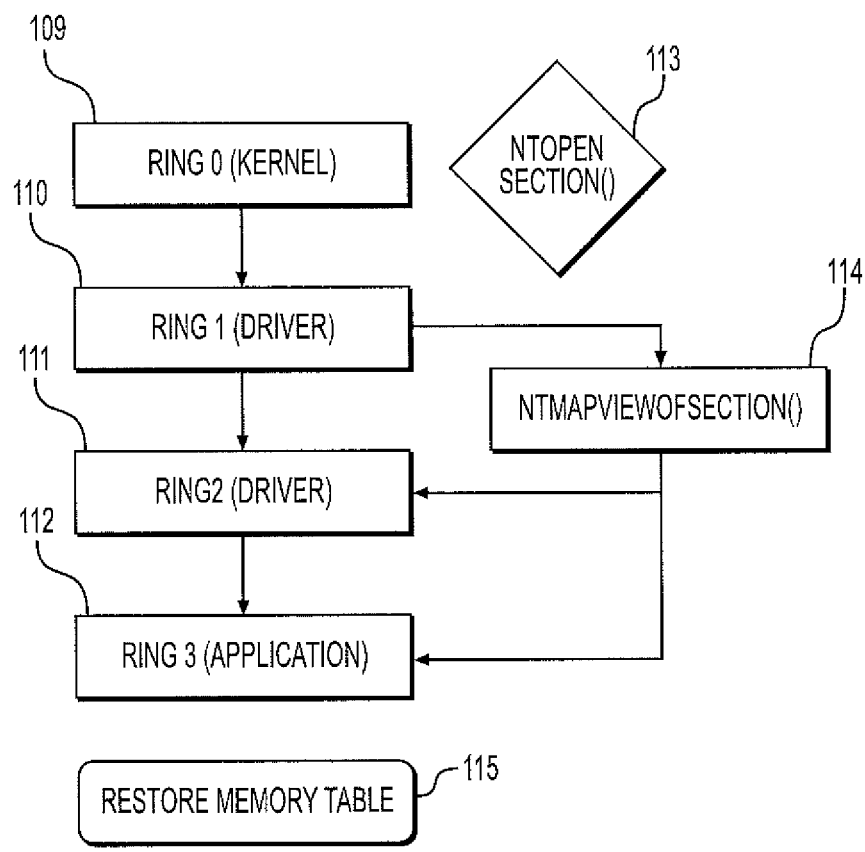
FIG. 2 is a diagram of the action of the embodiments of the present invention in defeating the operation of Memory Scraping Malware.

FIG. 2 shows the general embodiment implemented by the protection driver 102 for protecting the CHD when it is first inputted into the USB/COM device 101 (see FIG. 1), and for defeating the operation of memory scraping malware. The invention is implemented as the protection driver 102 residing in the system memory of a Point-of-Sale system. In particular, the protection driver 102 is composed of processes at a zero-ring level using physical RAM that can be opened as a section in the memory named "\\Device\\PhysicalMemory" with NtOpenSection( ) 113, and then mapped with NtMapViewOfSection( ) 114 native API functions which include Ring 0 Kernel highest level drivers 109, Ring 1 intermediate drivers 110 and Ring 2 low level drivers 111 in the NT Kernel and communicate to Ring 3 (user land) applications 112 to establish a 0 ring hook. A targeted physical address is mapped with NtMapViewOfSection( ) pointer; and write access is provided to "\\Device\\PhysicalMemory" using NtOpenSection call to WRITE_DAC and READ_CONTROL. This allows the software module of the invention to monitor for the presence or operation of anomalous processes that are indicative of the presence of malware. This then allows the software module of the invention to restore the Memory Table of the Point-of-Sale system 115. Various implementations for the process of restoring the memory table 115 will be discussed in further detail hereinbelow.

Figure 3:
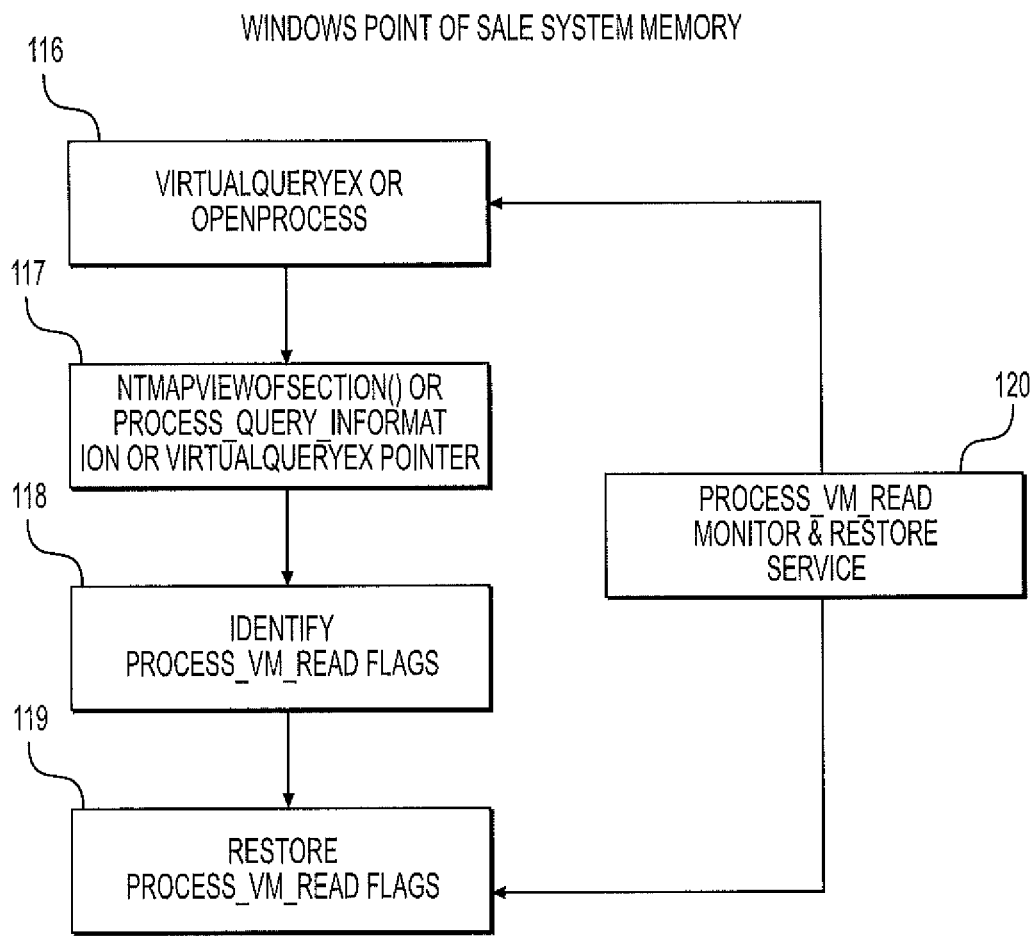
FIG. 3 is a diagram of the actions of the embodiments of the present invention in defeating the action of Memory Scraping.

FIG. 3 is a diagram of one embodiment for implementing the protection application 104 (see FIG. 1) to defeat the malware or mutex performing memory scraping. The protection application 104 implements a Monitor & Restore Service 120 continuously scanning and removing PROCESS_VM_Read flags in system memory from a defined set of vulnerable processes. Specifically, the protection application 104 calls the VirtualQueryEx and OPENPROCESS functions for a defined point of sale application process 116 and determines a 0 ring hook or local level hook. The targeted physical address is then mapped with NtMapViewOfSection( ) or PROCESS_QUERY_INFORMATION or VirtualQueryEx pointer 117. Write access is then granted to "\\Device\\PhysicalMemory" using NtOpenSection to identify PROCESS_VM_Read flags and monitor for PROCESS_VM_Read system calls 118. When a PROCESS_VM_Read flag change call made by wininet call is detected 118, the call is unhooked, the PROCESS_VM_Read flag is restored to null, and the system hooks are restored 119.

In a variation of the above process, memory scraping can also be prevented by blocking or adding a read only flag to read memory processes PROCESS_VM_READ from dwDesiredAccess.

Figure 4A:
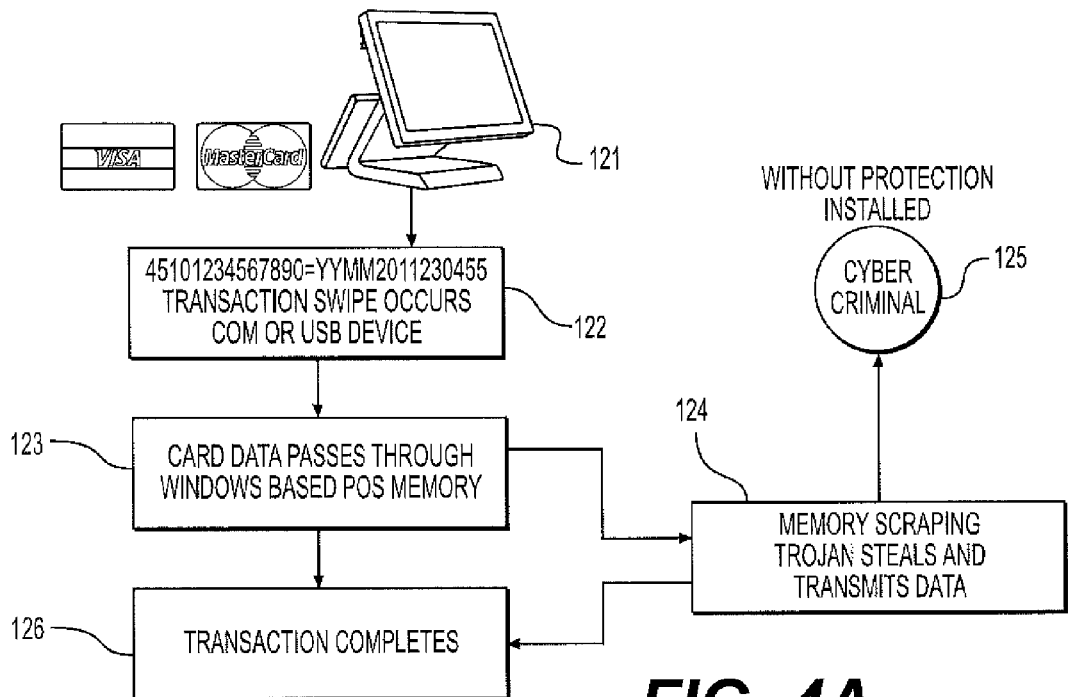
FIGS. 4A and 4B shows block diagrams of the flow of a credit card transaction with and without the Memory Scraping protection.
Figure 4B:
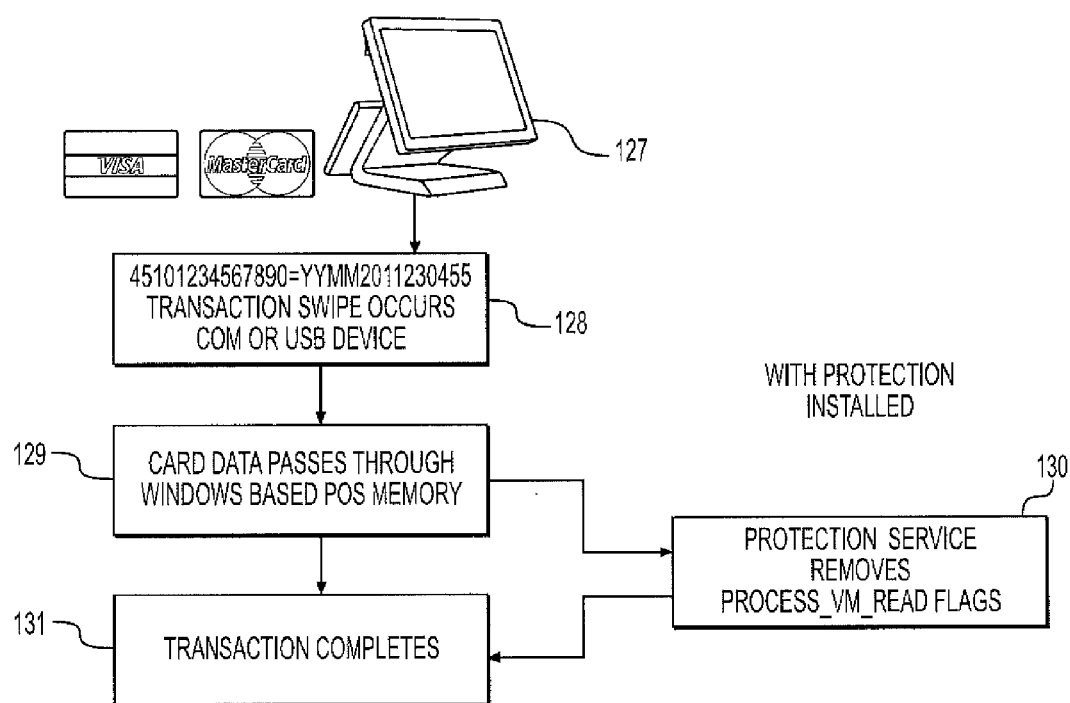

FIGS. 4A and 4B show block diagrams of the flow of a credit card transaction with and without the Memory Scraping protection. As illustrated in FIG. 4A, in a conventional credit card transaction, at a Point-of-Sale (POS) terminal 121, a transaction swipe occurs through a COM or USB device 122 connected to or that is part of the Point-of-Sale terminal 121. Typically, the Point-of-Sale terminal 121 uses a Windows-based or other similar operating system. Card data passes through the memory 123 of the POS terminal 121 that uses a Windows-based or other similar operating system. In an otherwise normal operation, the transaction is completed 126 wherein the POS terminal 121 communicates through the Internet with the bank and/or credit card server to receive authorization for the transaction and to debit the proper account(s).

If memory scraping Trojan malware is present in or is accessing the POS terminal 121, the card data is extracted and thereby stolen 124 from the POS terminal 121. The stolen card data is then transmitted to a cybercriminal 125.

As shown in FIG. 4B, in a Point-of-Sale system where the present invention is implemented, in a conventional credit card transaction, at a Point-of-Sale (POS) terminal 127, a transaction swipe occurs through a COM or USB device 128 connected to or that is part of the Point-of-Sale terminal 127. Card data passes through the memory 129 of the POS terminal 127, and the transaction is completed 131 wherein the POS terminal 127 communicates through the Internet with the bank and/or credit card server to receive authorization for the transaction and to debit the proper account(s). Unlike a conventional transaction, with the present invention implemented in the POS terminal 127 or at least in the network that controls the POS terminal 127, the present invention in at least one embodiment removes PROCESS_VM_READ flags from dwDesiredAccess, thereby preventing memory scraping Trojan malware from accessing and/or extracting the cad data from the POS terminal 127.

Figure 5:
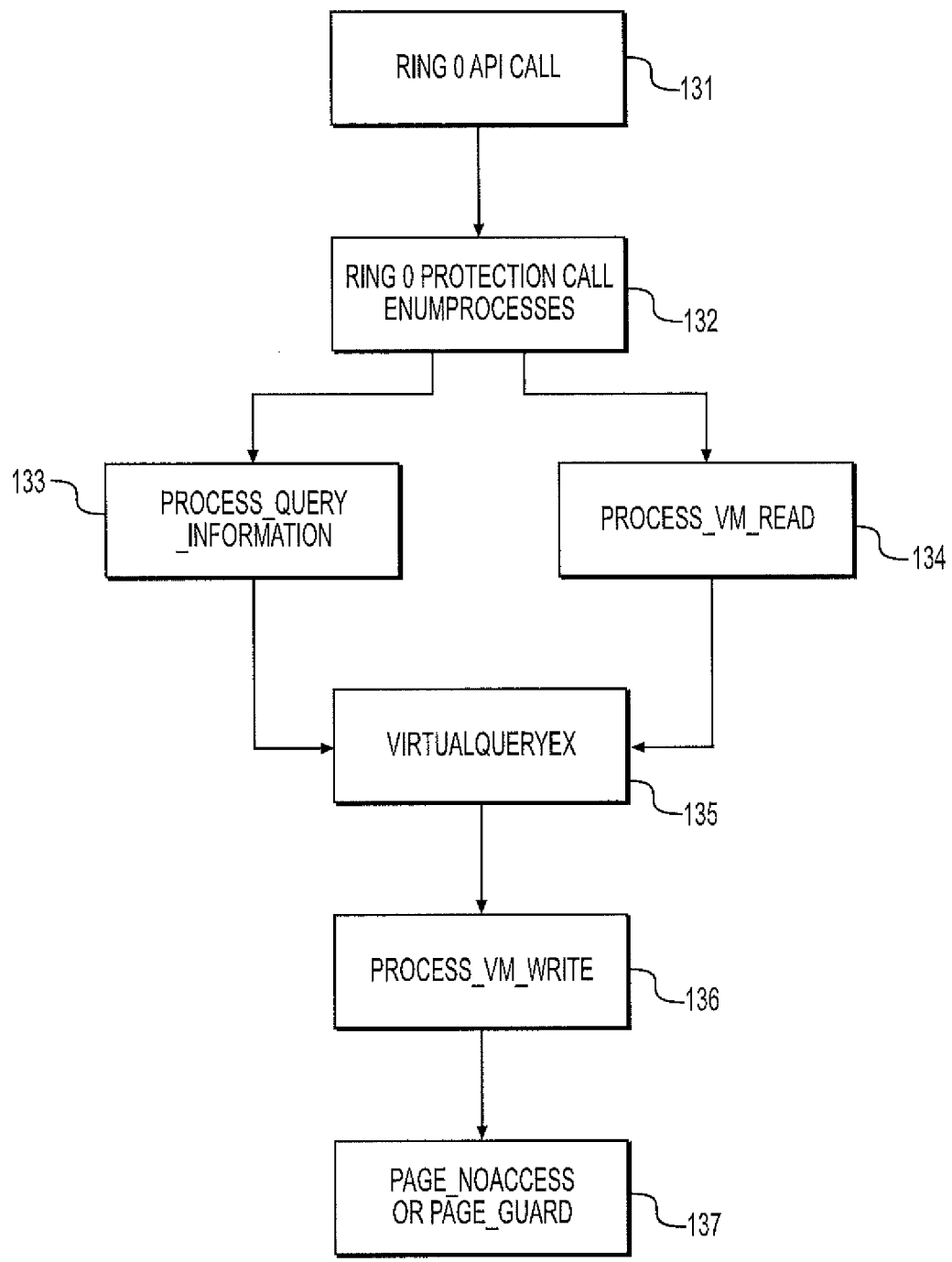
FIG. 5 is a diagram that illustrates the manner in which the invention functions to maintain its position in an API stack.

FIG. 5 is a diagram of a second embodiment for implementing the protection application 104 (see FIG. 1) to defeat the malware or mutex performing memory scraping, and functions to maintain its position in an API stack. In particular, FIG. 5 illustrates the entire scanning process from RING 0 to PAGE_NOACCESS or PAGE_GUARD, wherein memory scraping is prevented by blocking or adding a read only flag to read memory processes PROCESS_VM_READ from dwDesiredAccess, which is a Microsoft openaccess memory function. The protection application 104 scans for PAGE_NOACCESS and PAGE_GUARD flags in system memory from a defined set of vulnerable processes while calling the OpenProcess function for a defined Point-of-Sale application process. The protection application 104 generates a Ring 0 API call 131 to a Ring 0 Protection call ENUMPROCESSES 132 which covers the dwDesiredAccess and other call names. The protection application 104 then calls with PROCESS_QUERY_INFORMATION 133 or PROCESS_VM_Read 134 to monitor for flags and system calls. The VirtualQueryEx pointer is then used to map the targeted physical address 135. PROCESS_VM_Write 136 accesses the system memory. PAGE_NOACCESS and PAGE_GUARD flags are then removed from the system memory 137.

FIG. 6 is a diagram that illustrates the current credit card magnetic stripe data standard. As shown, there are Track 1 standard and Track 2 standard. There are up to three tracks on magnetic cards known as tracks 1, 2, and 3. Track 3 is virtually unused by the major worldwide networks, and often isn't even physically present on the card by virtue of a narrower magnetic stripe. Point-of-sale card readers almost always read track 1, or track 2, and sometimes both, in case one track is unreadable. The minimum cardholder account information needed to complete a transaction is present on both tracks. Track 1 has a higher bit density (210 bits per inch vs. 75), is the only track that may contain alphabetic text, and hence is the only track that contains the cardholder's name.

Track 1 is written with code known as DEC SIXBIT plus odd parity. The information on track 1 on financial cards is contained in several formats: A, which is reserved for proprietary use of the card issuer, B, which is described below, C-M, which are reserved for use by ANSI Subcommittee X3B10 and N-Z, which are available for use by individual card issuers:

Track 1, Format B:
   Start sentinel—one character (generally '%')
   Format code="B"—one character (alpha only)
   Primary account number (PAN)—up to 19 characters. Usually, but not always, matches the credit card number printed on the front of the card.
   Field Separator—one character (generally '^')
   Name—2 to 26 characters
   Field Separator—one character (generally '^')
   Expiration date—four characters in the form YYMM.
   Service code—three characters
   Discretionary data—may include Pin Verification Key Indicator (PVKI, 1 character), PIN Verification Value (PVV, 4 characters), Card Verification Value or Card Verification Code (CVV or CVC, 3 characters)
   End sentinel—one character (generally '?')
   Longitudinal redundancy check (LRC)—it is one character and a validity character calculated from other data on the track.

The Track 2 format was developed by the banking industry (ABA). This track is written with a 5-bit scheme (4 data bits+1 parity), which allows for sixteen possible characters, which are the numbers 0-9, plus the six characters :;<=>?. The selection of six punctuation symbols may seem odd, but in fact the sixteen codes simply map to the ASCII range 0x30 through 0x3f, which defines ten digit characters plus those six symbols. The data format is as follows:
   Start sentinel—one character (generally ';')
   Primary account number (PAN)—up to 19 characters. Usually, but not always, matches the credit card number printed on the front of the card.
   Separator—one char (generally '=')

Expiration date—four characters in the form YYMM.
Service code—three digits. The first digit specifies the interchange rules, the second specifies authorization processing and the third specifies the range of services
Discretionary data—as in track one
End sentinel—one character (generally '?')
Longitudinal redundancy check (LRC)—it is one character and a validity character calculated from other data on the track. Most reader devices do not return this value when the card is swiped to the presentation layer, and use it only to verify the input internally to the reader.

In one embodiment, for example, a method of the present invention is described for protecting a computer system from Card Holder Data (CHD) theft that includes memory scraping malware or logging of user inputted data. The method for blocking memory scraping attacks includes the following steps. Upon detecting a credit card swipe submission event from local hardware or comport event, specific memory table events are flagged as unreadable, and immediately after allowing the data to be properly submitted, the system memory tables are cleared of data and specific memory processes are flagged as readable again.

Specifically, the method comprises steps of: specifying a particular application to be protected from unauthorized memory scraping of user input; identifying additional system processes that may serve as a source of unauthorized memory scraping of user input; installing a kernel level driver and system service which enumerates and identifies all running processes on the active machine; identifying all process identification (PID) of running applications and (RAM) Random-access memory flags; identifying and attaching to vulnerable system processes and removing PROCESS_VM_READ flags from dwDesiredAccess; and adding PAGE_NOACCESS or PAGE_GUARD flags when appropriate.

In another embodiment, for example, a module for inserting and executing predetermined software processes at a zero-ring level protecting kernel memory from manipulation of our protection processes, said software processes including: a module for monitoring all application processes in order to monitor system memory for suspicious PROCESS_VM_WRITE processes; and a module which block any attempts of memory scraping using PROCESS_QUERY_INFORMATION or queries using the flag PROCESS_ALL_ACCESS;

In another embodiment, for example, a system and method for protecting against Point of Sale malware using memory scraping is described that comprises: a process of intercepting data inputs or swiped Card Holder Data (CHD) at the hardware Interrupt level or zero-ring level; a process of (1) establishing a connection with COM port data (2) encrypting all data passed from the COM or USB ports (3) passing this data to the intended software application (4) decrypting the data with a software module and encryption key while adding PAGE_NOACCESS or PAGE_GUARD flags in memory.

In another embodiment, for example, System and Method for Protecting Against Point Of Sale Malware Using Memory Scraping is described that comprises: application software that is desired to be protected from unauthorized tampering of protection; a first module for protecting the application software from unauthorized tampering or disabling, wherein the first module blocks attempts at unauthorized logging from processes that run on the computer system in user mode; and a second module for blocking attempts at unauthorized logging from processes running in kernel mode. Both modules also block unauthorized disabling of the application or driver uninstallation.

Similar to the description provided in connection with FIG. 2, as shown in FIGS. 7-15, a protection driver is composed of processes at a zero-ring level using physical RAM that can be opened as a section in the memory named "\\Device\\PhysicalMemory" with NtOpenSection( ), and then mapped with NtMapViewOfSection( ) native API functions which include Ring 0 Kernel highest level drivers, Ring 1 intermediate drivers and Ring 2 low level drivers in the NT Kernel and communicate to Ring 3 (user land) applications to establish a 0 ring hook. A targeted physical address is mapped with NtMapViewOfSection( ) pointer; and write access is provided to "\\Device\PhysicalMemory" using NtOpenSection call to WRITE_DAC and READ_CONTROL. As explained above, this allows the software module of the invention to monitor for the presence or operation of anomalous processes that are indicative of the presence of malware. This then allows the software module of the invention to restore the Memory Table of the Point-of-Sale system 115.

Figure 7:
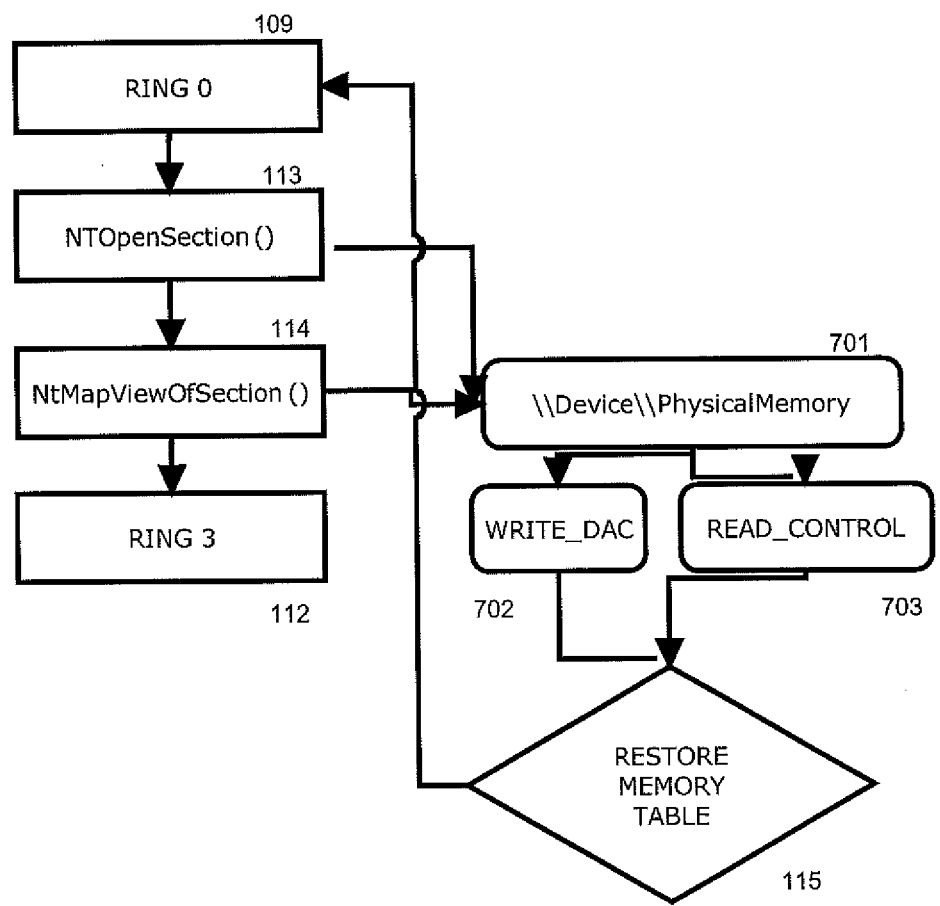
FIG. 7 is a diagram showing a first general implementation for processing malware or malware mutexes in restoring the memory table according to the present invention.
Figure 8:
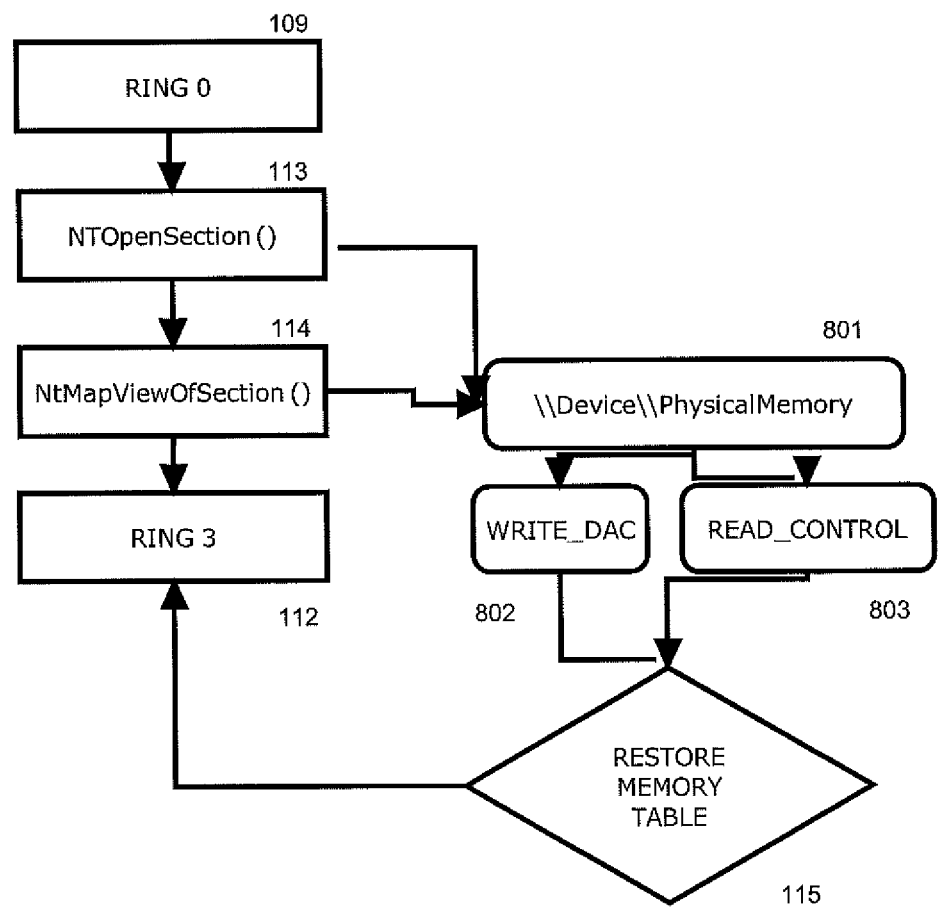
FIG. 8 is a diagram showing a second general implementation for processing malware or malware mutexes in restoring the memory table according to the present invention.

The process of restoring the memory table (see FIG. 2) may be implemented using any of several configurations. In general, as shown by FIGS. 7 and 8, the protection driver 102 is composed of processes at a zero-ring level using physical RAM that can be opened as a section in the memory named "\\Device\\PhysicalMemory" with NtOpenSection( ) 113, and then mapped with NtMapViewOfSection( ) 114 native API functions which include at least Ring 0 Kernel highest level drivers 109 and communicate to Ring 3 (user land) applications 112 to establish a 0 ring hook. A targeted physical address is mapped with NtMapViewOfSection( ) pointer 114; and write access is provided to \\Device\\PhysicalMemory 701,801 using NtOpenSection call 113 to WRITE_DAC 702,802 and READ_CONTROL 703,803. This allows the software module of the invention to monitor for the presence or operation of anomalous processes that are indicative of the presence of malware to then allow restoring of the Memory Table 115. As will be described further hereinbelow, different configurations may be used to process the malware or malware mutexes and then restore the 0 ring hooks (see FIG. 7) or restoring the Ring 3 local system hooks (see FIG. 8).

Figure 9:
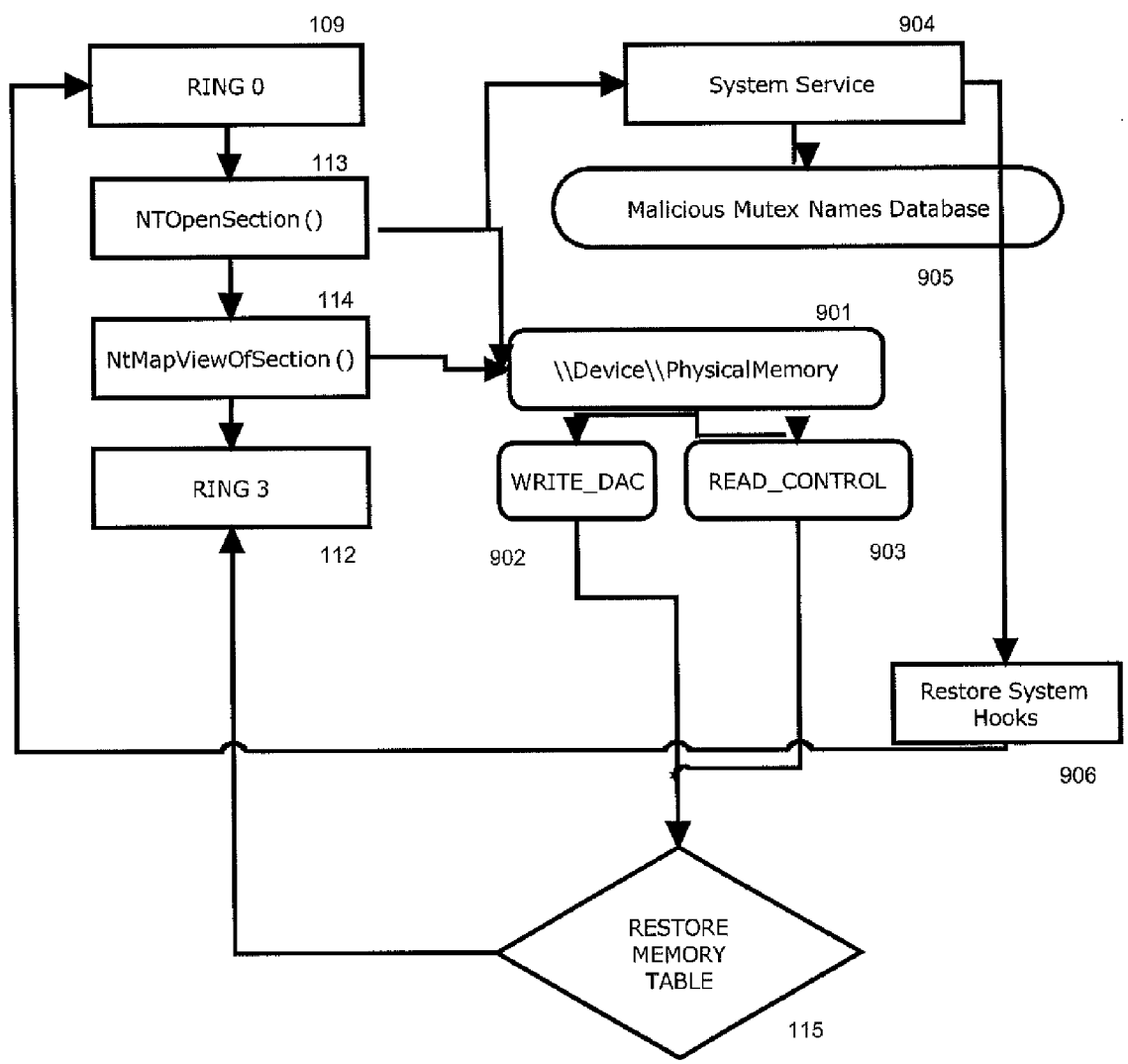
FIG. 9 is a diagram showing a first specific example implementation for processing malware or malware mutexes in restoring the memory table according to the present invention.

For example, in a first implementation in the case of detecting malicious system named pipes by comparing created system mutexes against established database of known malware mutexes and malware named pipes, as shown in FIG. 9, the step of restoring the memory table 115 includes: determining a 0 ring hook or local system hook; mapping the targeted physical address with NtMapViewOfSection( ) pointer 114; providing write access to \\Device\\PhysicalMemory 901 using NtOpenSection call 113 to WRITE_DAC 902 and READ_CONTROL 903; monitoring created mutexes or created system named pipe calls 904; scanning and comparing named pipes and created mutexes against an established database 905; when a match is found, terminating the named pipe call or mutex; and restoring system hooks 906.

In a variation of the above, according to a second implementation in the case of monitoring and blocking maliciously created program mutexes from a database, also as shown in FIG. 9, the step of restoring the memory table includes: determining a 0 ring hook or local system hook of established system processes; mapping the targeted physical address with NtMapViewOfSection( ) pointer 114; providing write access to \\Device\\PhysicalMemory 901 using NtOpenSection call 113 to WRITE_DAC 902 and READ_

CONTROL 903; monitoring system API calls for new established or created mutexes 904; comparing mutexes with a database of known malicious mutex names 905; when a match is found, creating an exact null mutex with the same name; and verifying malicious mutex has terminated and restoring system hooks 906.

Figure 10:
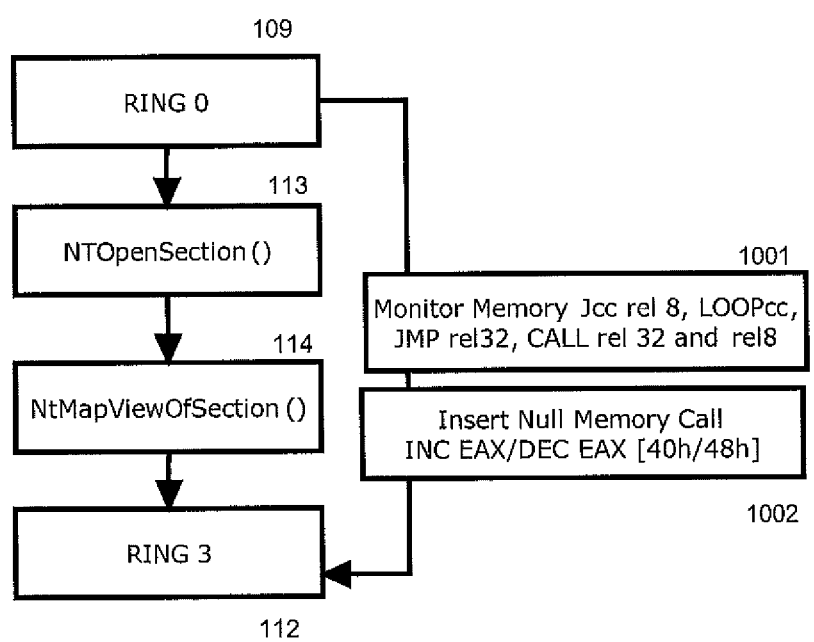
FIG. 10 is a diagram showing a second specific example implementation for processing malware or malware mutexes in restoring the memory table according to the present invention.

In a third implementation in the case of blocking malicious system API hooking through the use of standard detour hooks, as shown in FIG. 10, the step of restoring the memory table includes: determining a 0 ring hook in system API stack; mapping the targeted physical address with NtMapViewOfSection( ) pointer 114; providing write access using NtOpenSection call 113; monitoring system memory locations and attempts to relocate memory locations Jcc rel 8 or LOOPcc, JMP rel32, CALL rel 32 or rel8 instructions 1001; inserting a nulled memory call with an INC EAX/DEC EAX [40h/48h] memory instruction to fool a malicious process into assuming the API function is hooked already 1002; and then restoring system hooks.

Figure 11:
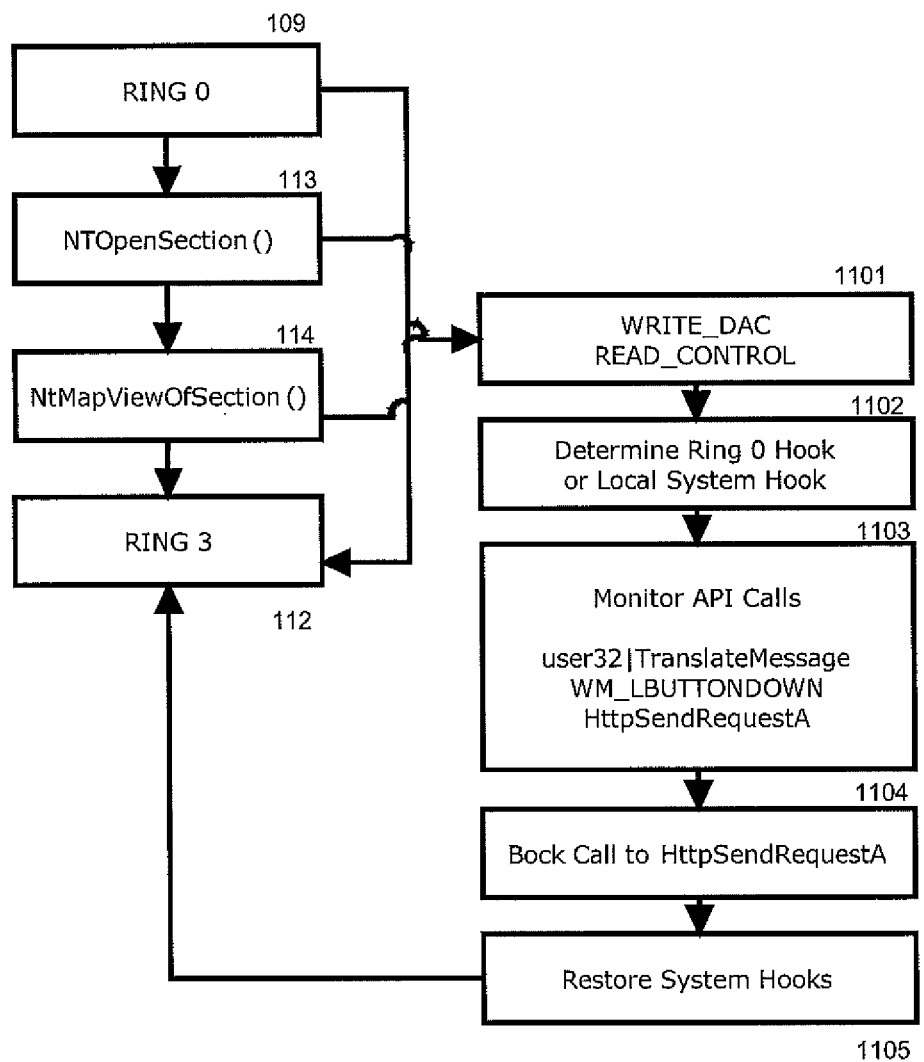
FIG. 11 is a diagram showing a third specific example implementation for processing malware or malware mutexes in restoring the memory table according to the present invention.

In a fourth implementation in the case of blocking malicious memory injection based screen recording or screen scraping attempts, as shown in FIG. 11, the step of restoring the memory table includes: providing write access using WRITE_DAC and READ_CONTROL 1101; determining 0 ring hook or local system hook 1102; monitoring import hook API calls to user32!TranslateMessage with calls to WM_LBUTTONDOWN with an accompanying call to HttpSendRequestA hook 1103; blocking the call to HttpSendRequestA 1104; and then restoring system hooks 1105.

Figure 12:
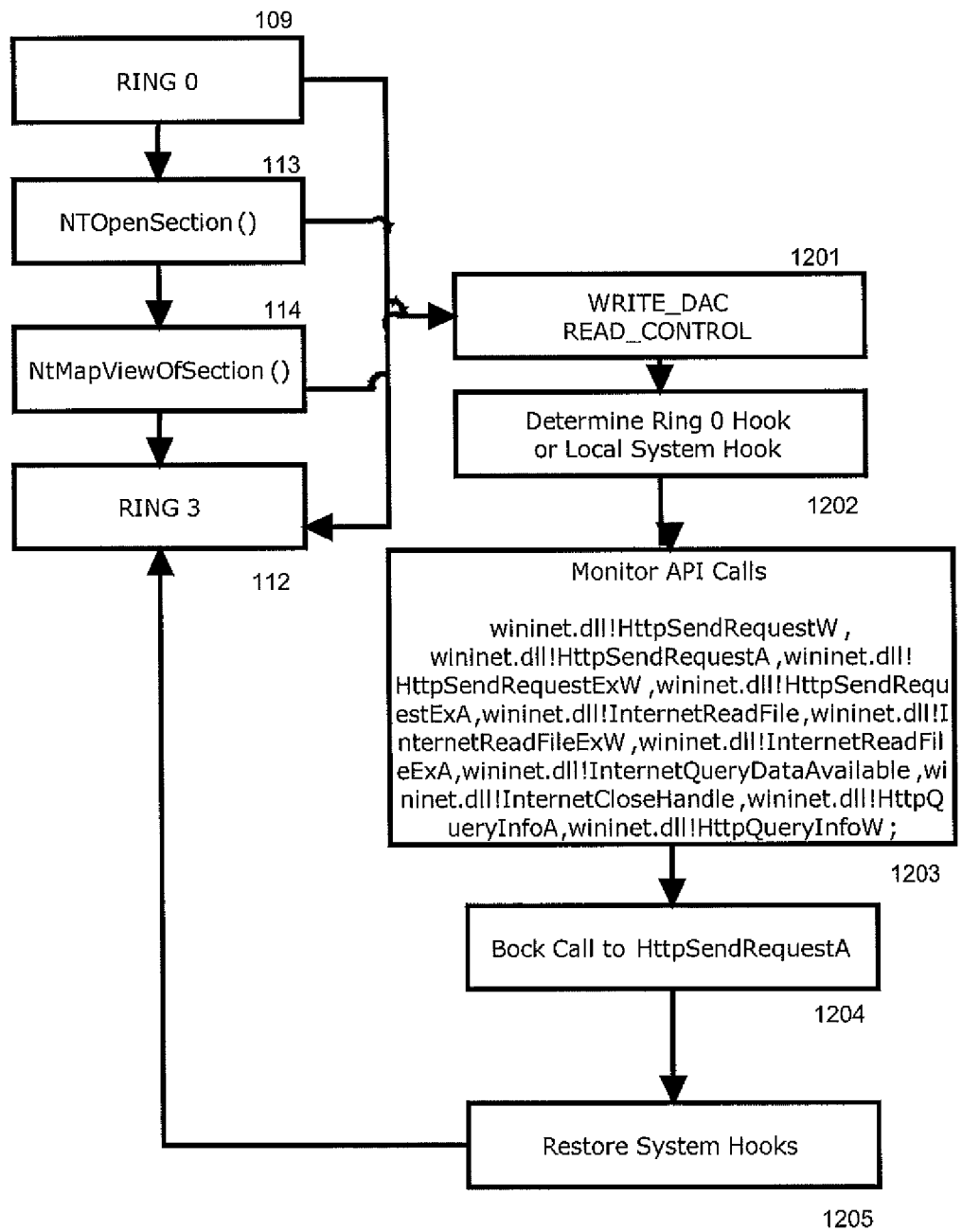
FIG. 12 is a diagram showing a fourth specific example implementation for processing malware or malware mutexes in restoring the memory table according to the present invention.

In a fifth embodiment in the case of blocking malicious memory browser injection, as shown in FIG. 12, the step of restoring the memory table includes: providing write access using WRITE_DAC and READ_CONTROL 1201; determining 0 ring hook or local system hook 1202; monitoring for at least one of the following wininet functions for memory based hooks: wininet.dll!HttpSendRequestW, wininet.dll!HttpSendRequestA, wininet.dll!HttpSendRequestExW, wininet.dll!HttpSendRequestExA, wininet.dll!InternetReadFile, wininet.dll!InternetReadFileExW, wininet.dll!InternetReadFileExA, wininet.dll!InternetQueryDataAvailable, wininet.dll!InternetCloseHandle, wininet.dll!HttpQueryInfoA, wininet.dll!HttpQueryInfoW 1203; detecting and nullifying attempted hooks by blocking the call to HttpSendRequestA 1204; and then restoring system hooks to a previous state 1205.

Figure 13:
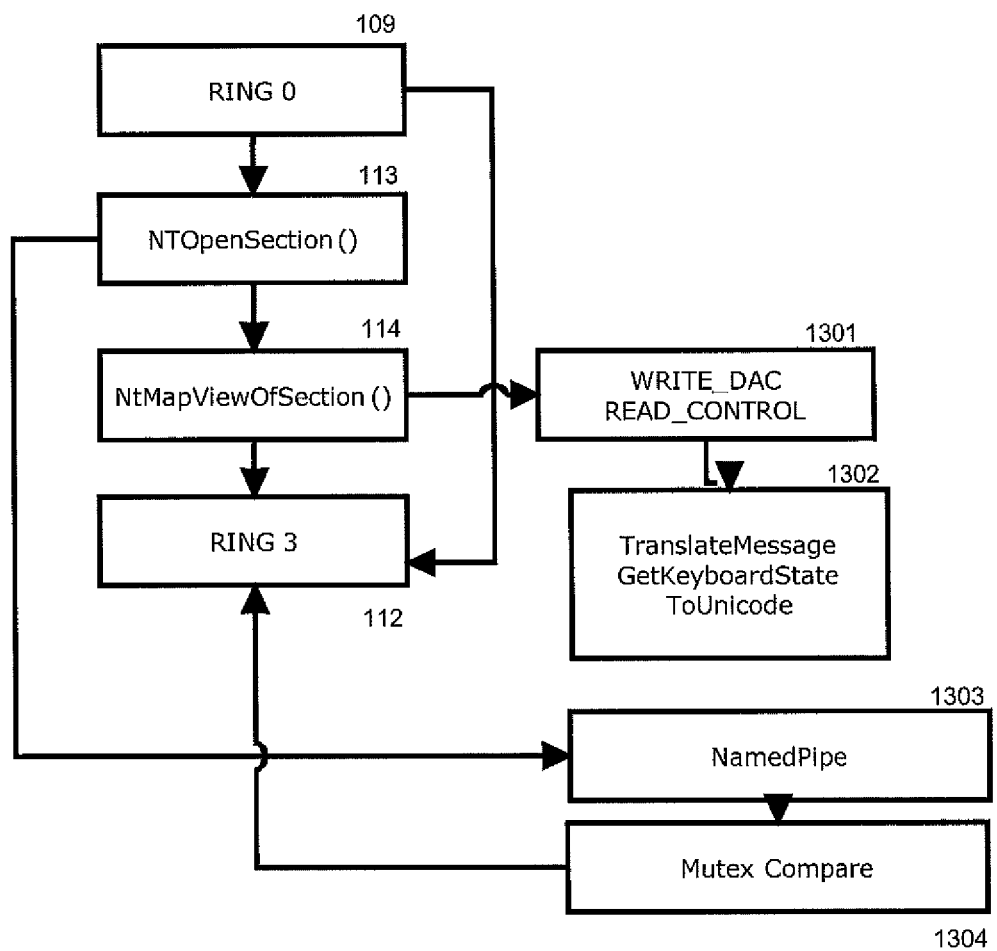
FIG. 13 is a diagram showing a fifth specific example implementation for processing malware or malware mutexes in restoring the memory table according to the present invention.

In a sixth implementation in the case of blocking memory injection based keystroke logging, as shown in FIG. 13, the step of restoring the memory table includes: mapping the targeted physical address with NtMapViewOfSection( ) pointer 114 to WRITE_DAC and READ_CONTROL 1301; monitoring for TranslateMessage, GetKeyboardState and ToUnicode(IpMsg wParam) hooks; and when at least one the TranslateMessage, GetKeyboardState and ToUnicode (IpMsg wParam) hooks is detected, unhooking an API call 1302; and then restoring system hooks. Write access is provided using NtOpenSection call 113, wherein created mutexes or created system named pipe calls are monitored and compared 1304.

Figure 14:
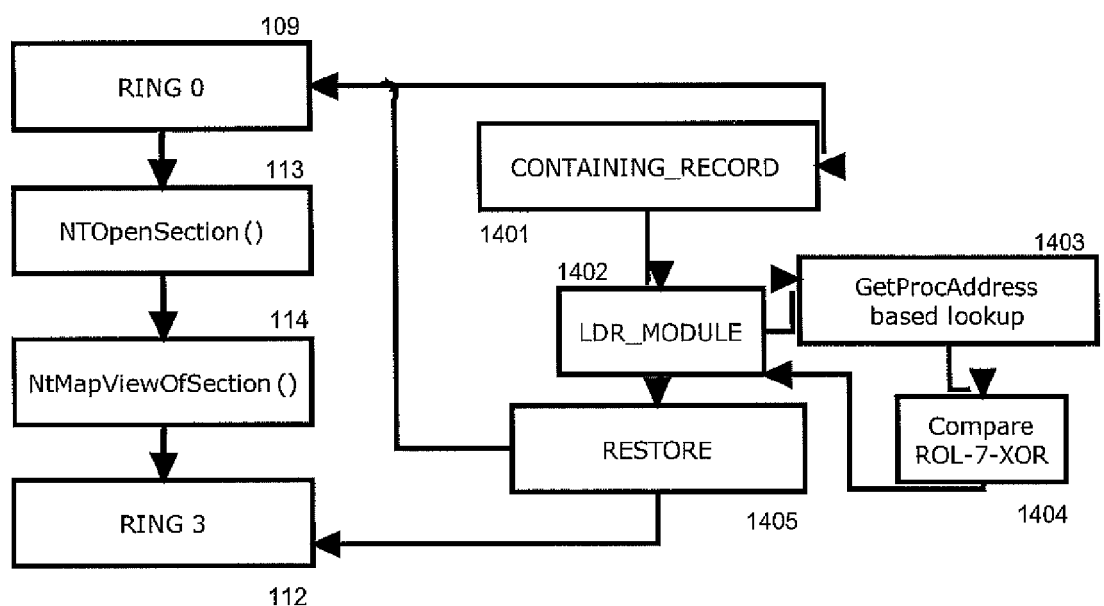
FIG. 14 is a diagram showing a sixth specific example implementation for processing malware or malware mutexes in restoring the memory table according to the present invention.

In a seventh implementation in the case of blocking malicious system buffer based API calls and system hooks by blocking malware anti-memory break point functions, as shown in FIG. 14, the step of restoring the memory table includes: establishing a 0 ring hook or local hook; scanning system calls in a loop for GetprocAddress based lookups 1403; comparing 32 or 64 bit ROL-7-XOR hash lookup processes against known malicious GetProcAddress based lookups 1404; and restoring dynamically loaded images to null 1405; and then restoring the system hooks.

Figure 15:
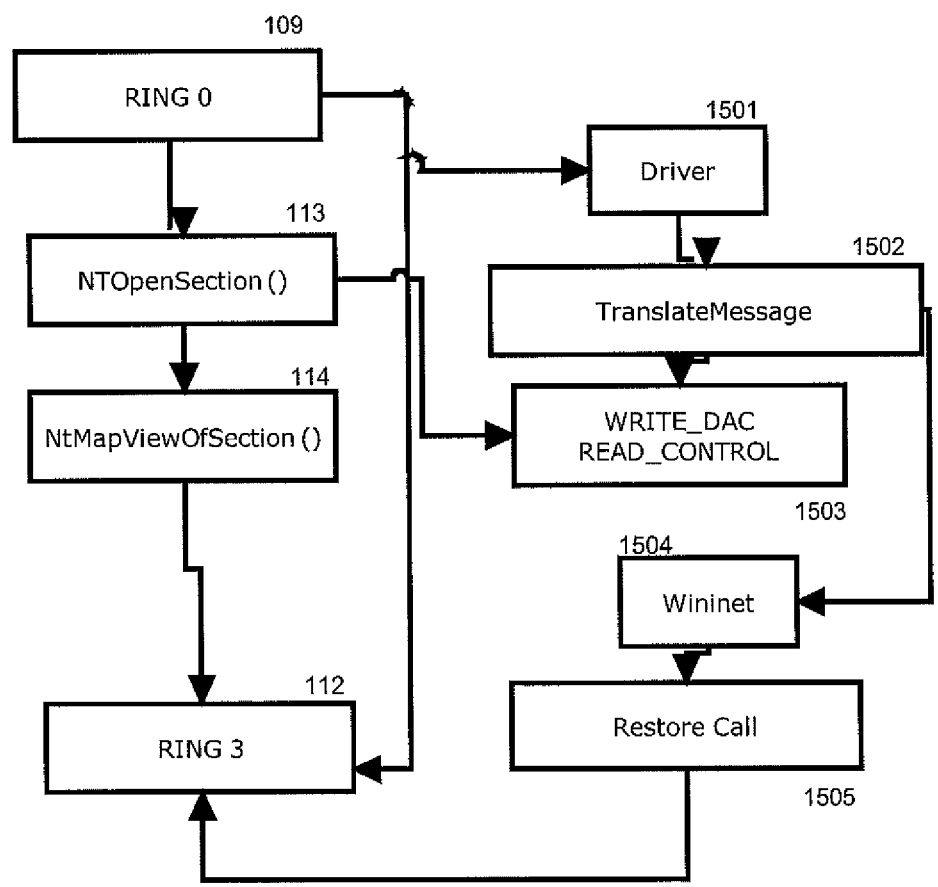
FIG. 15 is a diagram showing a seventh specific example implementation for processing malware or malware mutexes in restoring the memory table according to the present invention.

In an eighth embodiment in the case of blocking ring 3 keystroke logging using a windows function call TranslateMessage, as shown in FIG. 15, the step of restoring the memory table includes: determining a 0 ring hook or local level hook; monitoring for TranslateMessage system calls 1501,1502; when a TranslateMessage call by wininet call is detected 1504, unhooking the call and restoring the system call to null 1505; and then restoring system hooks 112.

Figure 16:
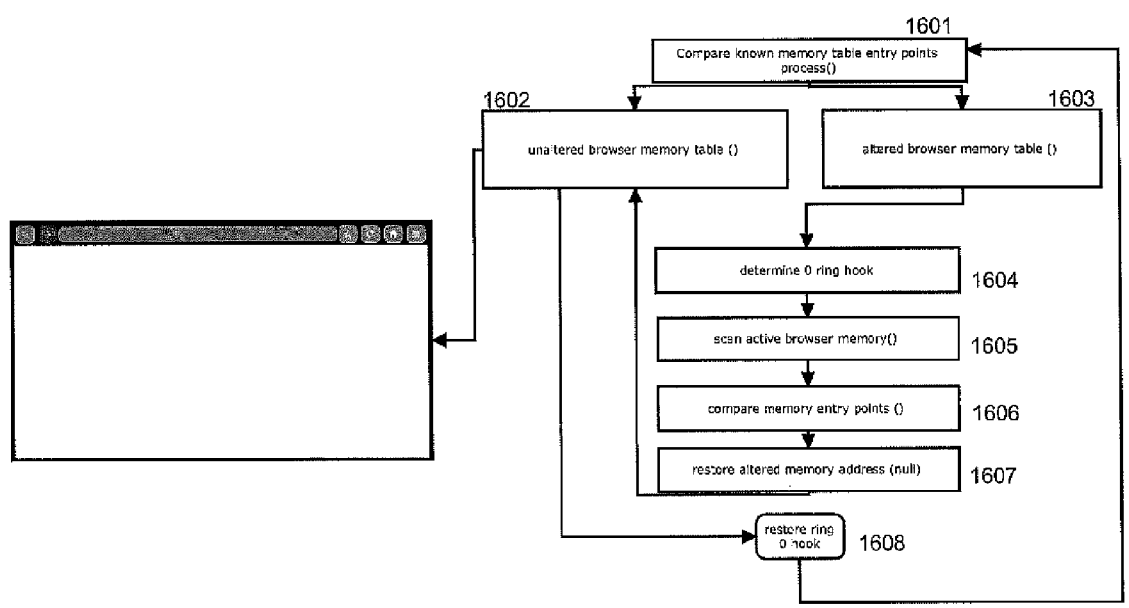
FIG. 16 is a diagram showing a eighth specific example implementation for processing malware or malware mutexes in restoring the memory table according to the present invention.

Further implementations for restoring the Memory Table would be available as variations of the implementations described hereinabove. These include the case of preventing a malicious memory table patching injection into an Internet browser, as shown in FIG. 16, wherein the steps for this implementation include: comparing 1601 known browser memory table entry points 1602 with altered table entry points 1603 in browser process chains and software hooks. The step of restoring the memory table includes: determining a 0 ring hook in an operating system to be scanned 1604; scanning active browser memory tables 1605; comparing memory entry points against known memory tables to establish if a malicious patch has occurred 1606; when the malicious patch occurs, restoring an altered memory table address to a clean state to render the malicious browser memory injection process null 1607; and then restoring the 0 ring hook 1608.

Figure 17:
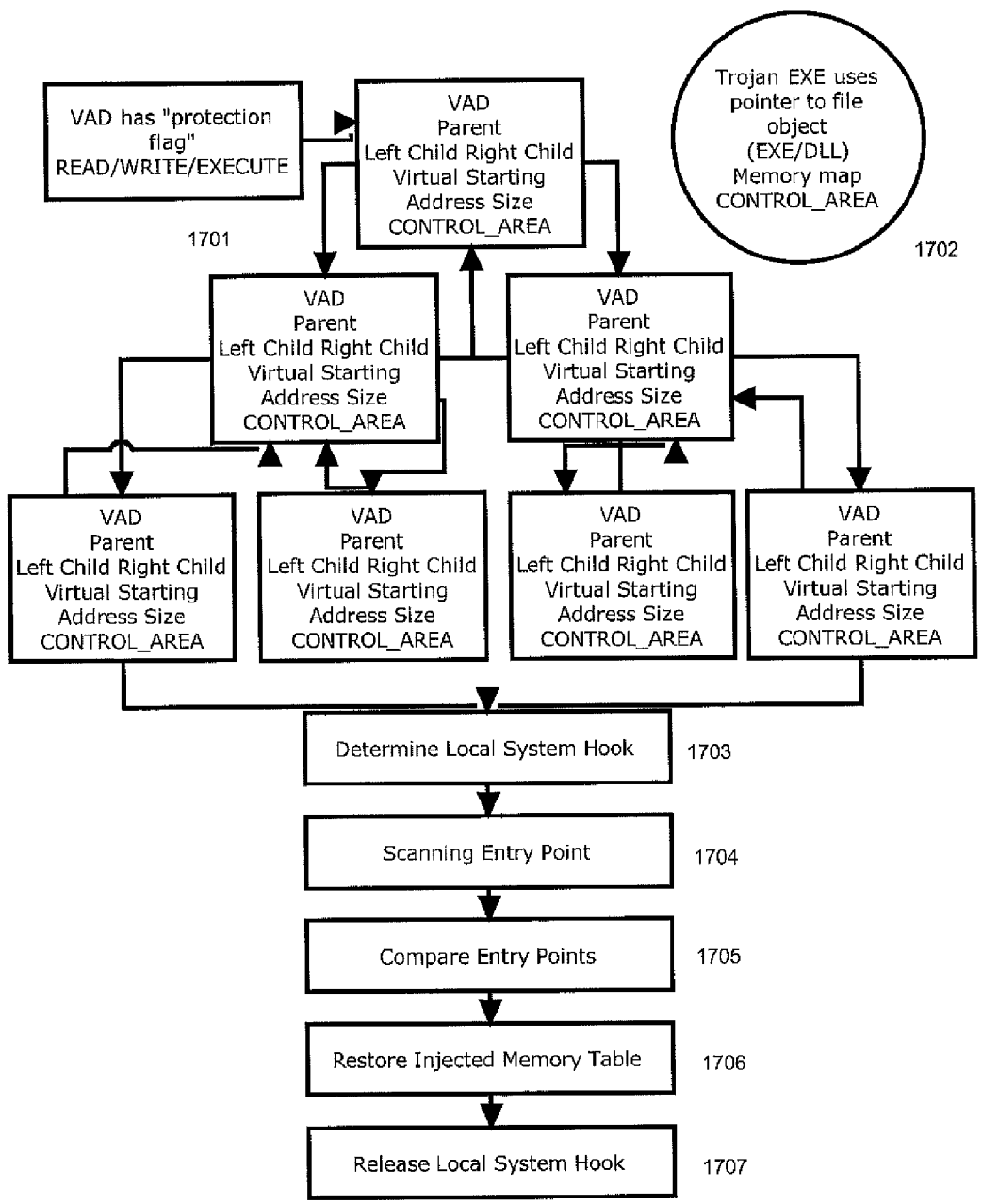
FIG. 17 is a diagram showing a ninth specific example implementation for processing malware or malware mutexes in restoring the memory table according to the present invention.

In an even further implementation in the case of monitoring and restoring system memory tables of computer operating system processes executed in memory management information (VAD: Virtual Address Descriptor 1701), as shown in FIG. 17, when a malicious process has injected itself into a new system processes 1702, the step of restoring the memory table includes: determining a local system hook 1703; scanning an entry point of an executable or dynamic link library file specified in a at least one of a Portable Executable header or a private hook procedure 1704; comparing entry points against known malware memory table entry points where VAD has a protection flag enabled (READ/WRITE/EXECUTE) in system processes or Internet browser memory tables 1705; restoring injected memory tables to original memory entry points 1706; and then releasing a local system hook 1707.

Figure 18:
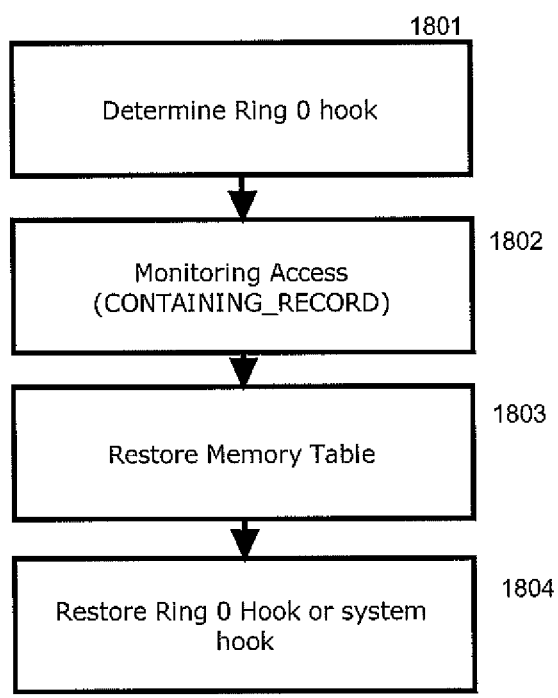
FIG. 18 is a diagram showing a tenth specific example implementation for processing malware or malware mutexes in restoring the memory table according to the present invention.

In another implementation in the case of determining system memory NTDLL protection of base addresses, as shown in FIG. 18, the step of restoring the memory table includes: determining a 0 ring hook or system level hook 1801; monitoring access to base addresses CONTAINING_RECORD(NtCurrentTeb( )→Peb→Ldr→InitializationOrderModuleList.Flink, LDR_MODULE or InInitializationOrderModuleList)→BaseAddress or system entry point API functions of NTDLL!NtQueryDirectoryFile, NTDLL!NtVdmControl, NTDLL!NtEnumerateValueKey, NTDLL!NtResumeThread, NTDLL!LdrLoadDll, user32.dll!TranslateMessage, wininet.dll!InternetCloseHandle, wininet.dll!HttpSendRequestA, wininet.dll!HttpSendRequestW, nspr4.dll!PR_Write (called by Firefox), ws2_32.dll!send, Advapi32.dll!CryptEncrypt 1802; when a memory injection or table alteration is detected, restoring tables 1803; and restoring the 0 ring hook or system hook 1804.

Figure 19:
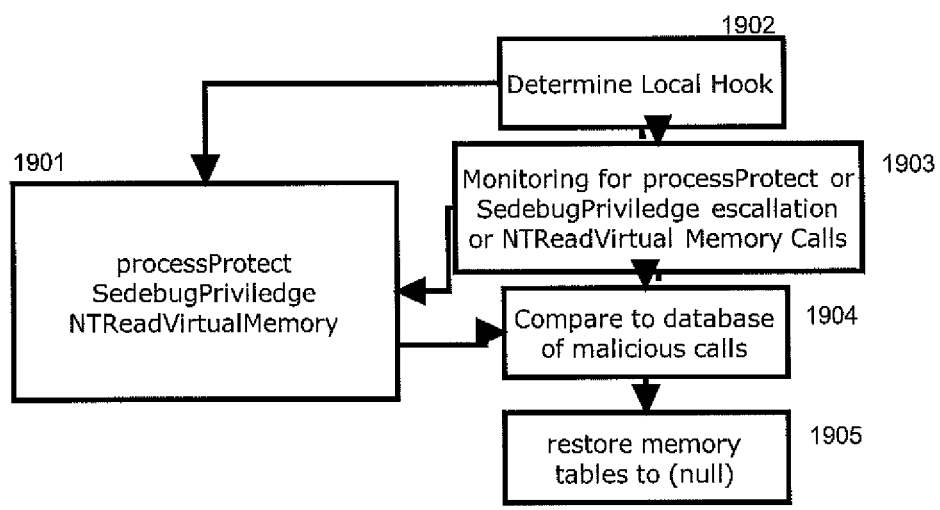
FIG. 19 is a diagram showing an eleventh specific example implementation for processing malware or malware mutexes in restoring the memory table according to the present invention.

In an even further implementation in the case of blocking injection of a malicious memory image injection into a remote processProtect, SedebugPrivilege escallation or NtReadVirtualMemory to access memory calls of a target process 1901, as shown in FIG. 19, the step of restoring the memory table includes: determining a local hook 1902;

monitoring for processProtect, SedebugPrivilege escallation or NtReadVirtualMemory memory calls 1903; comparing to a known database of malicious calls 1904; and restoring memory tables to null 1905.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A method for preventing malicious memory scraping executable by a microprocessor, the method comprising the steps of:
   providing a predetermined software processes at a zero-ring level using physical RAM that can be opened as a section named "\\Device\\PhysicalMemory" with NtOpenSection( );
   mapping with NtMapViewOfSection( ) native API functions which include Kernel highest level drivers, intermediate drivers and low level drivers in the NT Kernel and which communicate with Ring 3 (user land) applications to establish a 0 ring hook;
   mapping a targeted physical address with NtMapViewOfSection( ) pointer; providing write access to "\\Device\\PhysicalMemory" using NtOpenSection call to WRITEDAC and READCONTROL; and
   restoring a memory table;
      wherein the step of restoring the memory table includes:
         determining a local hook;
            monitoring for processProduct, SedebugPrivilege escalation or NtReadVirtualMemory memory calls; and comparing to a known database of malicious calls; and restoring memory tables to null.

2. The method for preventing malicious memory scraping according to claim 1,
   wherein the step of restoring the memory table includes:
   determining a 0 ring hook in an operating system to be scanned;
   scanning active browser memory tables;
   comparing memory entry points against known memory tables to establish if a malicious patch has occurred;
   when the malicious patch occurs, restoring an altered memory table address to a clean state to render the malicious browser memory injection process null; and
   restoring the 0 ring hook.

3. The method for preventing malicious memory scraping according to claim 1, wherein the step of restoring the memory table includes:
   determining a local system hook; scanning an entry point of an executable or dynamic link library file specified in at least one of a Portable Executable header or a private hook procedure;
   comparing entry points against known malware memory table entry points in system processes or Internet browser memory tables;
   restoring injected memory tables to original memory entry points; and
   releasing a local system hook.

4. The method for preventing malicious memory scraping according to claim 1, wherein the step of restoring the memory table includes:
   determining a 0 ring hook or local system hook of established system processes; monitoring system API calls for new established or created mutexes;
   comparing mutexes with a database of known malicious mutex names;
   when a match is found, creating an exact null mutex with the same name; and
   verifying malicious mutex has terminated and restoring system hooks.

5. The method for preventing malicious memory scraping according to claim 1, wherein the step of restoring the memory table includes: determining a 0 ring hook or system level hook; monitoring access to base addresses CONTAININGRECORD(NtCurrentTeb( )→PebLdr→InInitializationOrderModuleList.Flink, LDRMODULE or InInitializationOrderModuleList)→BaseAddress or system entry point API functions of NTDLL!NtQueryDirectoryFile, NTDLL!NtVdmControl, NTDLL!NtEnumerateValueKey, NTDLL !NtResumeThread, NTDLL!LdrLoadDll, user32. dll!TranslateMessage, wininet.dll!InternetCloseHandle, wininet.dll!HttpSendRequestA, wininet.dll!HttpSendRequestW, nspr4.dll!PR_Write (called by Firefox), ws2_32.dll!send, Advapi32.dll!CryptEncrypt;
   when a memory injection or table alteration is detected, restoring tables; and restoring the 0 ring hook or system hook.

6. The method for preventing malicious memory scraping according to claim 1, wherein the step of restoring the memory table includes:
   establishing a 0 ring hook or local hook; scanning system calls in a loop for GetprocAddress based lookups; comparing 32 or 64 bit ROL-7-XOR hash lookup processes against known malicious GetProcAddress based lookups; and
   restoring dynamically loaded images to null; and
   restore system hooks.

7. The method for preventing malicious memory scraping according to claim 1, wherein the step of restoring the memory table includes: determining a 0 ring hook in system API stack; monitoring system memory locations and attempts to relocate memory locations Jcc rel 8 or LOOPcc, JMP rel32, CALL rel 32 or rel8 instructions; inserting a nulled memory call with an INC EAX/DEC EAX [40h/48h] memory instruction to fool a malicious process into assuming the API function is hooked already; and restoring system hooks.

8. The method for preventing malicious memory scraping according to claim 1, wherein the step of restoring the memory table includes:
   determining a 0 ring system API hook;
   monitoring for TranslateMessage, GetKeyboardState and ToUnicode(lpMsg wParam) hooks; and
   when at least one the TranslateMessage, GetKeyboardState and ToUnicode(lpMsg wParam) hooks is detected, unhooking an API call; and
   restoring system hooks.

9. The method for preventing malicious memory scraping according to claim 1, wherein the step of restoring the memory table includes:
   determining a 0 ring hook or local system hook;
   monitoring created mutexes or created system named pipe calls; scanning and comparing named pipes and created mutexes against an established database;
   when a match is found, terminating the named pipe call or mutex; and
   restoring system hooks.

10. The method for preventing malicious memory scraping according to claim 1, wherein the step of restoring the memory table includes:

determining 0 ring hook or local system hook;

monitoring import hook API calls to user32!TranslateMessage with calls to WM_LBUTTONDOWN with an accompanying call to HttpSendRequestA hook blocking call to HttpSendRequestA; and restoring system hooks.

11. The method for preventing malicious memory scraping according to claim 1, wherein the step of restoring the memory table includes:

determining a 0 ring hook or local system hook;

monitoring for at least one of the following wininet functions for memory based hooks:

wininet.dll!HttpSendRequestW, wininet.dll!HttpSendRequestA, wininet.dll!HttpSendRequestExW, wininet.dll!HttpSendRequestExA, wininet.dll!InternetReadFile, wininet.dll!InternetReadFileExW, wininet.dll!InternetReadFileExA, wininet.dll!InternetQueryDataAvailable, wininet.dll!InternetCloseHandle, wininet.dll!HttpQueryInfoA, wininet.dll!HttpQueryInfoW; and detecting and nullifying attempted hooks; and restoring system hooks to a previous state.

12. The method for preventing malicious memory scraping according to claim 1, wherein the step of restoring the memory table includes:

determining a 0 ring hook or local level hook;

monitoring for TranslateMessage system calls;

when a TranslateMessage call by wininet call is detected, unhooking the call and restoring the system call to null; and restoring system hooks.

13. A method for preventing memory scraping, executable by a microprocessor, by continuously scanning and removing PROCESS_VMRead flags in system memory from a defined set of vulnerable processes while calling the VirtualQueryEx and OPENPROCESS functions for a defined point of sale application process, the method comprising the steps of:

determining a 0 ring hook or local level hook;

map targeted physical address with NtMapViewOfSection( ) or PROCESS_QUERYINFORMATION or VirtualQueryEx pointer;

grant write access to "\\Device\\PhysicalMemory" using NtOpenSection identify PROCESS_VM_Read flags;

monitoring for PROCESS_VM_Read system calls;

when a PROCESS_VM_Read flag change call is made by wininet call is detected, unhooking the call and restoring the flag to null; and restoring system hooks.

14. The method for preventing memory scraping according to claim 13, further comprising the step of:

at least one of blocking and adding a read only flag to read memory processes PROCESSVMREAD from dwDesiredAccess.

15. The method for preventing memory scraping according to claim 13, further comprising the step of:

continuously scanning and removing PAGE_NOACCESS and PAGEGUARD flags in system memory from a defined set of vulnerable processes while calling the Open Process function for a defined point of sale application process.

16. The method for preventing memory scraping according to claim 13, further comprising the step of:

continuously scanning and removing PROCESSQUERY_ INFORMATION and PROCESS_ALL_ACCESS flags in system memory from a defined set of vulnerable processes while calling the Open Process function for a defined point of sale application process.

\* \* \* \* \*